(12) United States Patent
Huang et al.

(10) Patent No.: US 11,436,656 B2
(45) Date of Patent: Sep. 6, 2022

(54) SYSTEM AND METHOD FOR A REAL-TIME EGOCENTRIC COLLABORATIVE FILTER ON LARGE DATASETS

(71) Applicant: Palo Alto Research Center Incorporated, Palo Alto, CA (US)

(72) Inventors: Eric Huang, San Francisco, CA (US); Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 954 days.

(21) Appl. No.: 15/074,922

(22) Filed: Mar. 18, 2016

(65) Prior Publication Data

US 2017/0270590 A1    Sep. 21, 2017

(51) Int. Cl.
*G06Q 30/06*    (2012.01)

(52) U.S. Cl.
CPC ..... *G06Q 30/0631* (2013.01); *G06Q 30/0643* (2013.01)

(58) Field of Classification Search
None
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Moldovan, "Streaming rows of SQL Server data to a table valued parameter using a SQLDataReader," MSSQLTips.com, Mar. 2011, (https://www.mssqltips.com/sqlservertip/2338/streaming-rows-of-sql-server-data-to-a-table-valued-parameter-using-a-sqldatareader/) (Year: 2011).*

(Continued)

*Primary Examiner* — Michelle T Kringen
(74) *Attorney, Agent, or Firm* — Burns & Levinson, LLP; Steven M. Mills

(57) ABSTRACT

One embodiment of the present invention provides a system for generating a product recommendation. During operation, the system obtains data indicating vertices and edges of a graph. The vertices represent consumers and products and an edge represents an access relationship. The system may receive a query indicating an ego for determining a product recommendation. The system may then traverse the graph from a vertex representing the ego through a plurality of edges to a plurality of vertices representing products. The system may traverse the graph from the plurality of vertices representing products to a plurality of vertices representing other consumers. The system may then traverse the graph from the plurality of vertices representing other consumers to a plurality of vertices representing other products. The system may generate a recommendation that based on the plurality of vertices representing other products.

20 Claims, 15 Drawing Sheets

(56) References Cited

U.S. PATENT DOCUMENTS

| | | | |
|---|---|---|---|
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,052,683 | A | 4/2000 | Irwin |
| 6,085,320 | A | 7/2000 | Kaliski, Jr. |
| 6,091,724 | A | 7/2000 | Chandra |
| 6,173,364 | B1 | 1/2001 | Zenchelsky |
| 6,226,618 | B1 | 5/2001 | Downs |
| 6,233,617 | B1 | 5/2001 | Rothwein |
| 6,233,646 | B1 | 5/2001 | Hahm |
| 6,332,158 | B1 | 12/2001 | Risley |
| 6,366,988 | B1 | 4/2002 | Skiba |
| 6,438,579 | B1 * | 8/2002 | Hosken ............ G06F 17/30867 707/999.002 |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,862,280 | B1 | 3/2005 | Bertagna |
| 6,901,452 | B1 | 5/2005 | Bertagna |
| 6,917,985 | B2 | 7/2005 | Madruga |
| 6,968,393 | B1 | 11/2005 | Chen |
| 6,981,029 | B1 | 12/2005 | Menditto |
| 7,013,389 | B1 | 3/2006 | Srivastava |
| 7,031,308 | B2 | 4/2006 | Garcia-Luna-Aceves |
| 7,061,877 | B1 | 6/2006 | Gummalla |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,787 | B1 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,177 | B2 | 9/2010 | Luss |
| 7,816,441 | B2 | 10/2010 | Elizalde |
| 7,831,733 | B2 | 11/2010 | Sultan |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 8,000,267 | B2 | 8/2011 | Solis |
| 8,010,691 | B2 | 8/2011 | Kollmansberger |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,312,064 | B1 | 11/2012 | Gauvin |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,533,742 | B2 * | 9/2013 | Ginis ..................... H04L 67/28 719/315 |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |
| 8,903,756 | B2 | 12/2014 | Zhao |
| 8,923,293 | B2 | 12/2014 | Jacobson |
| 8,934,496 | B2 | 1/2015 | Vasseur |
| 8,937,865 | B1 | 1/2015 | Kumar |
| 8,972,969 | B2 | 3/2015 | Gaither |
| 8,977,596 | B2 | 3/2015 | Montulli |
| 9,071,498 | B2 | 6/2015 | Beser |
| 9,112,895 | B1 | 8/2015 | Lin |
| 2002/0010795 | A1 | 1/2002 | Brown |
| 2002/0038296 | A1 | 3/2002 | Margolus |
| 2002/0048269 | A1 | 4/2002 | Hong |
| 2002/0054593 | A1 | 5/2002 | Morohashi |
| 2002/0077988 | A1 | 6/2002 | Sasaki |
| 2002/0078066 | A1 | 6/2002 | Robinson |
| 2002/0138551 | A1 | 9/2002 | Erickson |
| 2002/0152305 | A1 | 10/2002 | Jackson |
| 2002/0176404 | A1 | 11/2002 | Girard |
| 2002/0188605 | A1 | 12/2002 | Adya |
| 2002/0199014 | A1 | 12/2002 | Yang |
| 2003/0004621 | A1 | 1/2003 | Bousquet |
| 2003/0033394 | A1 | 2/2003 | Stine |
| 2003/0046396 | A1 | 3/2003 | Richter |
| 2003/0046437 | A1 | 3/2003 | Eytchison |
| 2003/0048793 | A1 | 3/2003 | Pochon |
| 2003/0051100 | A1 | 3/2003 | Patel |
| 2003/0061384 | A1 | 3/2003 | Nakatani |
| 2003/0074472 | A1 | 4/2003 | Lucco |
| 2003/0088696 | A1 | 5/2003 | McCanne |
| 2003/0097447 | A1 | 5/2003 | Johnston |
| 2003/0099237 | A1 | 5/2003 | Mitra |
| 2003/0140257 | A1 | 7/2003 | Peterka |
| 2003/0229892 | A1 | 12/2003 | Sardera |
| 2004/0024879 | A1 | 2/2004 | Dingman |
| 2004/0030602 | A1 | 2/2004 | Rosenquist |
| 2004/0064737 | A1 | 4/2004 | Milliken |

(56) References Cited

U.S. PATENT DOCUMENTS

| | | |
|---|---|---|
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077001 A1* | 3/2009 | Macready ........... G06F 16/2452 706/57 |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |

(56) References Cited

U.S. PATENT DOCUMENTS

| | | |
|---|---|---|
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |

(56) References Cited

U.S. PATENT DOCUMENTS

| | | | |
|---|---|---|---|
| 2014/0195666 | A1 | 7/2014 | Dumitriu |
| 2014/0214942 | A1 | 7/2014 | Ozonat |
| 2014/0233575 | A1 | 8/2014 | Xie |
| 2014/0237085 | A1 | 8/2014 | Park |
| 2014/0245359 | A1 | 8/2014 | DeFoy |
| 2014/0254595 | A1 | 9/2014 | Luo |
| 2014/0280823 | A1 | 9/2014 | Varvello |
| 2014/0281489 | A1 | 9/2014 | Peterka |
| 2014/0281505 | A1 | 9/2014 | Zhang |
| 2014/0282816 | A1 | 9/2014 | Xie |
| 2014/0289325 | A1 | 9/2014 | Solis |
| 2014/0289790 | A1 | 9/2014 | Wilson |
| 2014/0298248 | A1 | 10/2014 | Kang |
| 2014/0314093 | A1 | 10/2014 | You |
| 2014/0337276 | A1 | 11/2014 | Iordanov |
| 2014/0365550 | A1 | 12/2014 | Jang |
| 2015/0006896 | A1 | 1/2015 | Franck |
| 2015/0018770 | A1 | 1/2015 | Baran |
| 2015/0032892 | A1 | 1/2015 | Narayanan |
| 2015/0039890 | A1 | 2/2015 | Khosravi |
| 2015/0063802 | A1 | 3/2015 | Bahadur |
| 2015/0089081 | A1 | 3/2015 | Thubert |
| 2015/0095481 | A1 | 4/2015 | Ohnishi |
| 2015/0095514 | A1 | 4/2015 | Yu |
| 2015/0149484 | A1* | 5/2015 | Kelley .............. G06F 17/30398 707/748 |
| 2015/0188770 | A1 | 7/2015 | Naiksatam |
| 2015/0195149 | A1 | 7/2015 | Vasseur |
| 2015/0207633 | A1 | 7/2015 | Ravindran |
| 2015/0207864 | A1 | 7/2015 | Wilson |
| 2016/0350662 | A1* | 12/2016 | Jin ........................... G06N 5/04 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |

OTHER PUBLICATIONS

Techopedia, "Database Management Systems (DBMS)," Jul. 23, 2011 https://web.archive.org/web/20110723213424/https://www.techopedia.com/definition/24361/database-management-systems-dbms (Year: 2011).*

Rodriguez, Marko A., and Peter Neubauer. "The Graph Traversal Pattern." Graph Data Management, pp. 29-46. Crossref, https://doi.org/10.4018/978-1-61350-053-8.ch002 (Year: 2010).*

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

"PBC Library-Pairing-Based Cryptography-About," http://crypto.stanford.edu/pbc. downloaded Apr. 27, 2015.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

(56) References Cited

OTHER PUBLICATIONS

Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.eom/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.

(56) References Cited

OTHER PUBLICATIONS

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. Vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

Mcwilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE-A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptolog—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/documents/Phenomenal H 2012/Sandvine Global Internet Phenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. RajaChatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

(56) References Cited

OTHER PUBLICATIONS

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digit.

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/www.adobe.com/content/dam/Adobe/en/devnet/rtmp/ pdf/rtmp specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al. "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

* cited by examiner

300

| CONSUMER ID | MEDIA ID | NUMBER OF VOTES |
|---|---|---|
| 24 | 16131683 | 6788 |
| 24 | 16141710 | 5270 |
| 24 | 16140198 | 4963 |
| 24 | 16164258 | 4917 |
| 24 | 16131161 | 4694 |
| 24 | 16132928 | 4653 |
| 30 | 16633648 | 12913 |
| 30 | 16632778 | 12610 |
| 30 | 16331575 | 11257 |
| 30 | 16331614 | 9049 |
| 30 | 16132045 | 8954 |
| 30 | 16132036 | 8088 |

FIG. 3

```
1   create table results as
2   (select ego, mid, votes from
3       (select ego, mid, votes, rank() over (partition by ego order by votes desc) as popularity from
4           (select friends_media.ego, a3.mid, count(a3.cid) votes from
5               (select distinct e.cid ego, a2.cid friend, count(*) in_common from
6                   batched_egos e
7                   inner join accessed a on e.cid = a.cid
8                   inner join accessed a2 on a.mid = a2.mid
9                   where e.cid != a2.cid
10                  group by e.cid, a2.cid) friends_media
11              inner join accessed a3 on friends_media.friend = a3.cid
12              where friends_media.in_common >= 1
13              group by friends_media.ego, a3.mid))
14  where popularity <= 100
15  order by ego, popularity asc, mid);
```

FIG. 4

| STEP | DESCRIPTION | HIPERGRAPH PRIMITIVES |
|---|---|---|
| 1. | INITIALIZE THE REQUIRED DATA STRUCTURES AND SET THE EGO VERTEX (CONSUMER) AS THE STARTING POINT. | ARRAY INITIALIZATION |
| 2. | TRAVERSE THE EDGES REPRESENTING THE "ACCESSED" RELATIONSHIP TO A SET OF VERTICES REPRESENTING MEDIA. | REACHABILITY GRAPH TRAVERSAL |
| 3. | TRAVERSE FROM THAT SET OF MEDIA, THE EDGES REPRESENTING THE "ACCESSED" RELATIONSHIP TO A SET OF VERTICES REPRESENTING OTHER CONSUMERS. | REACHABILITY GRAPH TRAVERSAL |
| 4. | FROM EACH OF THESE CONSUMERS, TRAVERSE THEIR ADJACENT EDGES TO REACH THE SET OF VERTICES REPRESENTING THE MEDIA THEY ACCESSED. AT EACH MEDIA VERTEX, TALLY UP THE NUMBER OF CONSUMERS FROM WHICH THE SYSTEM TRAVERSES TO ARRIVE AT THE MEDIA VERTEX. | TOKEN COUNTING (VALUE ACCUMULATION) |
| 5. | SORT THE RESULTS BASED ON THE TALLIES AT EACH MEDIA VERTEX AND RETURN THE TOP K MEDIA. | NONE (CAN USE QSORT) |

FIG. 5

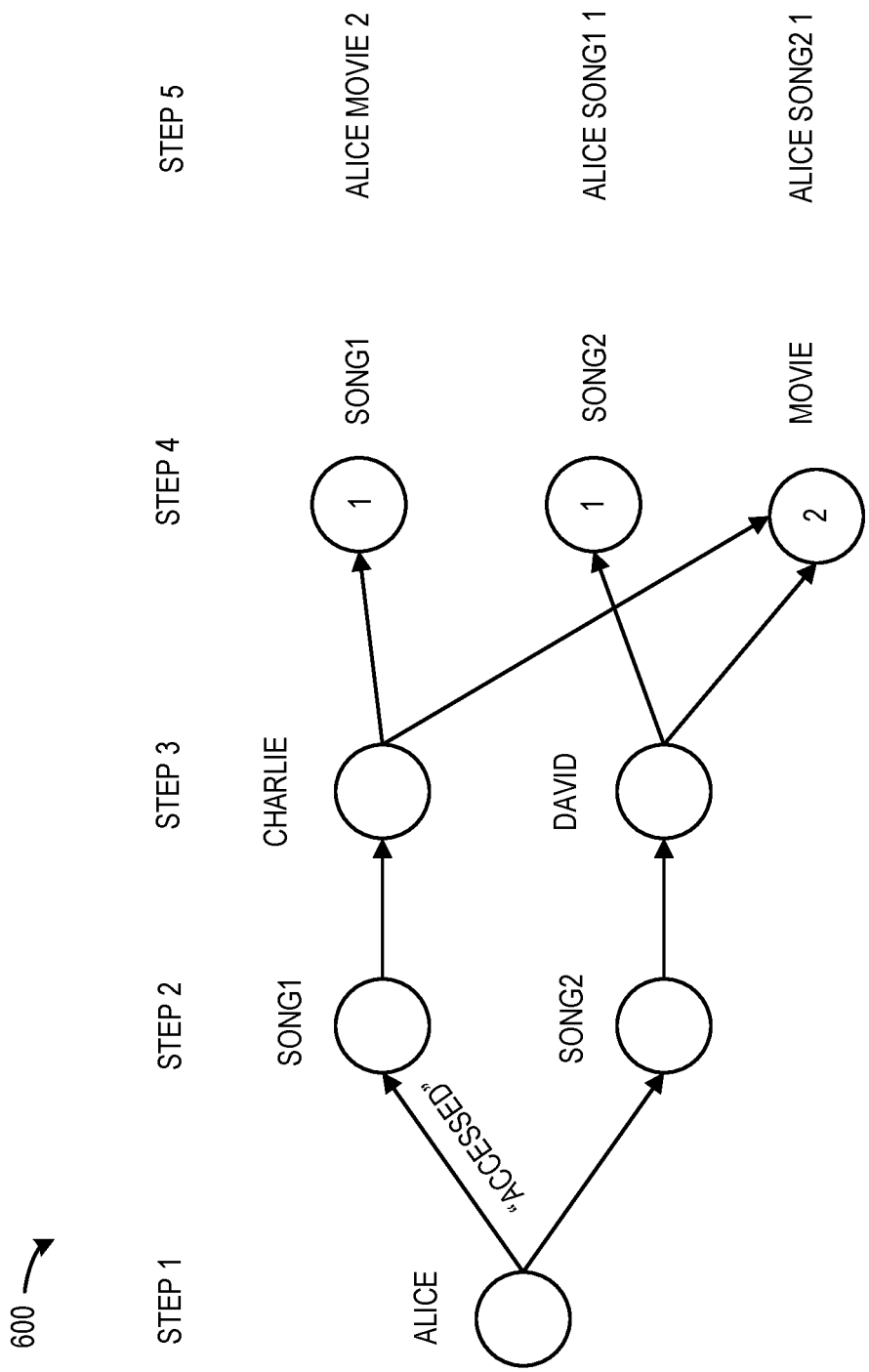

| HANA VS. HANA+HIPERGRAPH | 0.1K EGOS | 1K EGOS | 10K EGOS | 100K EGOS |
|---|---|---|---|---|
| 1 MONTH, ~10M ROWS | 0:21 HANA<br>1:10 HANA+HG | 1:07 HANA<br>1:07 HANA+HG | 9:51 HANA<br>1:44 HANA+HG | 1:11:50 HANA<br>0:06:46 HANA+HG |
| 3 MONTHS, ~30M ROWS | 0:57 HANA<br>3:25 HANA+HG | 0:40 HANA<br>3:33 HANA+HG | 28:54 HANA<br>04:41 HANA+HG | 53:46 HANA<br>17:36 HANA+HG |
| 1 YEAR, ~100M ROWS | 1:00 HANA<br>13:16 HANA+HG | 3:22 HANA<br>13:39 HANA+HG | Out of memory<br>16:21 HANA+HG | Out of memory<br>44:45 HANA+HG |
| MULTI-YEAR, ~300M ROWS | 02:38 HANA<br>40:01 HANA+HG | 32:55 HANA<br>40:56 HANA+HG | Out of memory<br>48:02 HANA+HG | Out of memory<br>1:59:35 HANA+HG |

FIG. 9

| EGOS | HIVE DISK SPACE REQUIRED | HIPERGRAPH MEMORY REQUIRED | HIVE TIME HH:MM:SS | HIPERGRAPH TIME HH:MM:SS |
|---|---|---|---|---|
| 1 | 8GB | 5GB | 0:20:00 | 0:40:01 |
| 10 | 8GB | 5GB | 0:20:00 | 0:40:02 |
| 100 | 8GB | 5GB | 0:27:00 | 0:40:06 |
| 1,000 | 127GB | 5GB | 2:06:00 | 0:40:56 |
| 10,000 | 948GB | 5GB | 14:29:00 | 0:48:02 |

| EGOS | HIVE TIME HH:MM:SS | GRAPH BUILD + STREAM HH:MM:SS | HIPERGRAPH COMPUTE HH:MM:SS |
|---|---|---|---|
| 1 | 0:20:00 | 0:40:01 | 0:0:0.05 |
| 10 | 0:20:00 | 0:40:01 | 0:0:0.5 |
| 100 | 0:27:00 | 0:40:01 | 0:0:5 |
| 1000 | 2:06:00 | 0:40:01 | 0:0:55 |
| 10,000 | 14:29:00 | 0:40:01 | 0:8:01 |

1. START WITH A GIVEN SET OF VERTICES (POSSIBLY ONLY A SINGLE ONE) INITIALIZED TO USER-SPECIFIED VALUES.

2. WHILE NOT DONE
    A. PERFORM EITHER A FORWARD OR BACKWARD GRAPH TRAVERSAL BY FORWARDING THE VALUES OF THE CURRENT SET OF VERTICES TO THEIR ADJACENT VERTICES.

B. APPLY SOME AGGREGATION FUNCTION WHICH SETS EACH VERTEX TO A VALUE PROPORTIONAL TO THE VALUES FROM THOSE ADJACENT VERTICES

C. APPLY SOME THRESHOLD FUNCTION TO EACH VERTEX

3. SORT THE RESULT AND RETURN THE TOP K VERTICES RANKED BY THEIR COMPUTED VALUES.

| STEP | HIPERGRAPH | RELATIONAL |
|---|---|---|
| 2A | TRAVERSE FORWARD OR BACKWARD FROM A SET OF VERTICES TO ANOTHER SET OF VERTICES | DATABASE JOIN |
| 2B | FOR EVERY VERTEX, SUM OR COUNT ALL VALUES FROM ITS INCOMING VERTICES | GROUP-BY, SUM OR COUNT |
| 2C | APPLY TO ALL VERTICES: APPLY MAP(VERTEX, DOMAIN OF VALUES), (E.G. SET VALUE TO ZERO) | WHERE CLAUSE |

FIG. 13

SYSTEM AND METHOD FOR A REAL-TIME EGOCENTRIC COLLABORATIVE FILTER ON LARGE DATASETS

The present disclosure is related to U.S. patent application Ser. No. 13/932,377, (Attorney Docket Number PARC-20130011-US-NP), titled "System and Method for Parallel Search on Explicitly Represented Graphs," by inventor Rong Zhou, filed 1 Jul. 2013, the disclosure of which is hereby incorporated by reference herein.

The present disclosure is related to U.S. patent application Ser. No. 14/148,435, (Attorney Docket Number PARC-20130013-US-NP), titled "Automated Compilation Of Graph Input For The Hipergraph Solver," by inventors Eric Huang, Rong Zhou and Daniel Davies, filed 6 Jan. 2014, the disclosure of which is hereby incorporated by reference herein.

The present disclosure is related to U.S. patent application Ser. No. 14/039,941, (Attorney Docket Number PARC-20130118-US-NP), titled "System And Method For A High-Performance Graph Analytics Engine," by inventors Rong Zhou and Daniel Davies, filed 27 Sep. 2013, the disclosure of which is hereby incorporated by reference herein.

BACKGROUND

Field

The present disclosure relates to recommendation systems. More specifically, this disclosure relates to a method and system for real-time egocentric collaborative filtering on large datasets using Hipergraph.

Related Art

HiperGraph is a stand-alone graph solver that performs analytics techniques on graph-based representation of data. Its strengths over a standard database lie in the characterization of computations as graph traversals instead of traditional, computationally-intensive relational database joins. HiperGraph specializes in graph reasoning and enables new real-time applications on a much larger volume of data for graph-based computations.

FIG. 1 presents a block diagram 100 illustrating an example of a database schema in a multimedia domain, and a corresponding example of how data may be represented in a graph model. The database in FIG. 1 has three tables. The first table 102 has "Accessed ID" as its primary key, and contains a set of rows, each representing a transaction where a particular consumer has accessed a particular piece of media content. The second table 104 has "Consumer ID" as its primary key, and each row represents a unique consumer along with its metadata. The third table 106 has "Media ID" as its primary key, and each row represents a unique digital asset along with its metadata.

The graph model 108 corresponding to this database schema has vertices representing consumers and media, and edges representing media accesses. The question presented in this example is "what new media should we recommend to a consumer based on his or her friends?" Here, a friend is defined as another consumer who has accessed at least one piece of content in common in the past.

In many cases similar to this domain, the underlying database tables may be constantly changing as additional access activities are added, implying changes to the graph itself. The changing nature of the data necessitates recomputing the same query in order to provide a time-relevant answer, and therefore performance is critical. For example, if a website dynamically provides recommendations, the website may need to respond to queries within seconds in real-time. Moreover, the fact that a server may need to answer queries from many users simultaneously interacting with the website further complicates the problem.

SUMMARY

One embodiment of the present invention provides a system for generating a product recommendation. During operation, the system obtains graph data indicating vertices and edges of a graph. The vertices represent consumers and products and an edge represents an access relationship. The system may receive a query to determine a product recommendation. The query indicates an ego for determining a product recommendation. The system may then traverse the graph from a vertex representing the ego through a plurality of edges to a plurality of vertices representing products. The system may traverse the graph from the plurality of vertices representing products to a plurality of vertices representing other consumers. The system may then traverse the graph from the plurality of vertices representing other consumers to a plurality of vertices representing other products. The system may generate a recommendation that based on the plurality of vertices representing other products.

In a variation on this embodiment, the system may generate the graph based on data from one or more database tables, and stream the graph from a Structured Query Language (SQL) database over a network to an executing application.

In a variation on this embodiment, the system may receive command-line parameters indicating a number of starting vertices, a number of recommendations to be generated, a number of traversals, or a number of media that must be shared in common between the ego and another consumer.

In a variation on this embodiment, the system may receive a second query to determine product recommendations for a plurality of egos. The system may then traverse, by a plurality of processors operating in parallel, the graph from the plurality of egos through a plurality of edges to a plurality of vertices representing products. The system may then traverse, by the plurality of processors operating in parallel, the graph from the plurality of vertices representing products to a plurality of vertices representing other consumers. The system may then traverse, by the plurality of processors operating in parallel, the graph from the plurality of vertices representing other consumers to a plurality of vertices representing other products. The system may calculate a tally for each of the plurality of vertices representing other products. The system may then sort the plurality of vertices representing other products, and generate a recommendation based on the sorted plurality of vertices representing other products.

In a variation on this embodiment, the graph has multiple edge types connecting vertices, and one of the edge types represents a like relationship between a respective consumer and a respective product, and wherein the vertex representing the ego and the plurality of vertices representing other consumers are also connected via edges representing like relationships.

In a variation on this embodiment, the system may calculate a tally for each of the plurality of vertices representing other products.

In a further variation, the system may sort and rank the plurality of vertices representing other products, and generate the recommendation to include one of: all products associated with the plurality of vertices representing other products and their corresponding tallies, products with tallies above a predetermined ranking, and all products and their corresponding tallies in which the corresponding tallies are greater than a predetermined user-specified value.

BRIEF DESCRIPTION OF THE FIGURES

FIG. 3 presents an example of formatted output of the collaborative filter, according to an embodiment.

FIG. 4 presents an example of a SQL query for the egocentric collaborative filter, according to an embodiment.

FIG. 5 illustrates an overview of an exemplary egocentric collaborative filter and implementation using HiperGraph primitives, according to an embodiment.

FIG. 6 presents a block diagram illustrating five stages of a technique for egocentric collaborative filtering, according to an embodiment.

FIG. 9 presents a table illustrating a comparison of two egocentric collaborative filtering implementations HANA-only and a combination of HANA and HiperGraph.

FIG. 10 presents a table of experimental results comparing implementations of the egocentric collaborative filter on Hadoop/Hive with HiperGraph.

FIG. 11 presents a table comparing time performance between Hive and HiperGraph, with a breakdown of graph building, streaming, and HiperGraph reasoning.

FIG. 12 presents a table illustrating a general template for a class of egocentric collaborative techniques that leverage paragraph primitives, in accordance with an embodiment.

FIG. 13 presents a table illustrating how Hipergraph primitives may map to relational primitives, in accordance with an embodiment.

In the figures, like reference numerals refer to the same figure elements.

DETAILED DESCRIPTION

Figure 1:
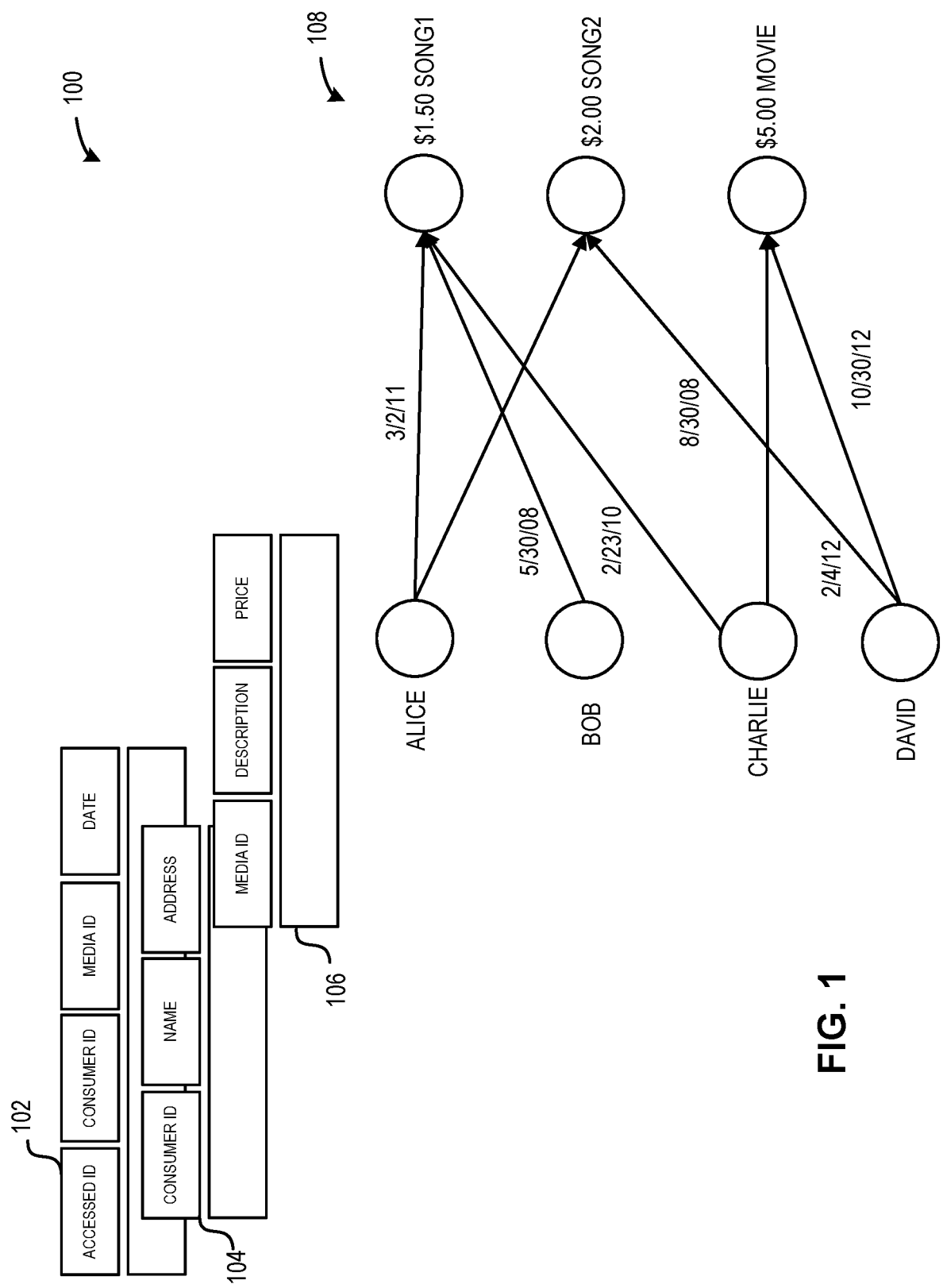
FIG. 1 presents a block diagram illustrating an example of a database schema in a multimedia domain, and a corresponding example of how data may be represented in a graph model.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improving performance of a collaborative filtering process by using Hipergraph primitives to perform operations on graph data rather than relying on a Structured Query Language (SQL) database to perform equivalent operations on data in relational tables. An egocentric collaborative filtering system may generate a graph model from consumer access data stored in a database and then apply Hipergraph primitives to efficiently perform collaborative filtering. For example, the system can use Hipergraph primitives to traverse forward or backward from one set of vertices to another set of vertices in order to perform a database join. By performing the join using a graph rather than using traditional relational tables, the system can significantly speed up computations and reduce the amount of memory required.

The recommendation technique this disclosure describes is one of a class of techniques which the inventors call egocentric collaborative filters. The term egocentric refers to the property that the computations reference a specific vertex which the inventors call the "ego," and frequently the set of graph operations that the system performs may originate from the ego. For example, the system can traverse a graph to determine media that a user (e.g., ego) accesses, and from vertices representing those media traverse the graph to determine other consumers that access the same media as the ego. The system can then traverse the graph again to determine media that the other consumers access to generate a recommendation.

The disclosure explains how a class of such techniques implemented using HiperGraph can achieve a significant boost in performance compared to standard approaches. Such performance improvements include that HiperGraph's intermediary computations when performing traversals does not significantly increase memory requirements. In contrast, for SQL databases, the intermediary computations associated with executing join operations significantly increases such memory requirements. For problem sizes of 1,000 recommendation queries or larger, experiments have demonstrated that the disclosed techniques dominate other approaches. This is seen in best-in-class comparisons to open source graph reasoning systems, an enterprise in-memory SQL server, and a Hive/Hadoop cluster.

System Architecture

Figure 2:
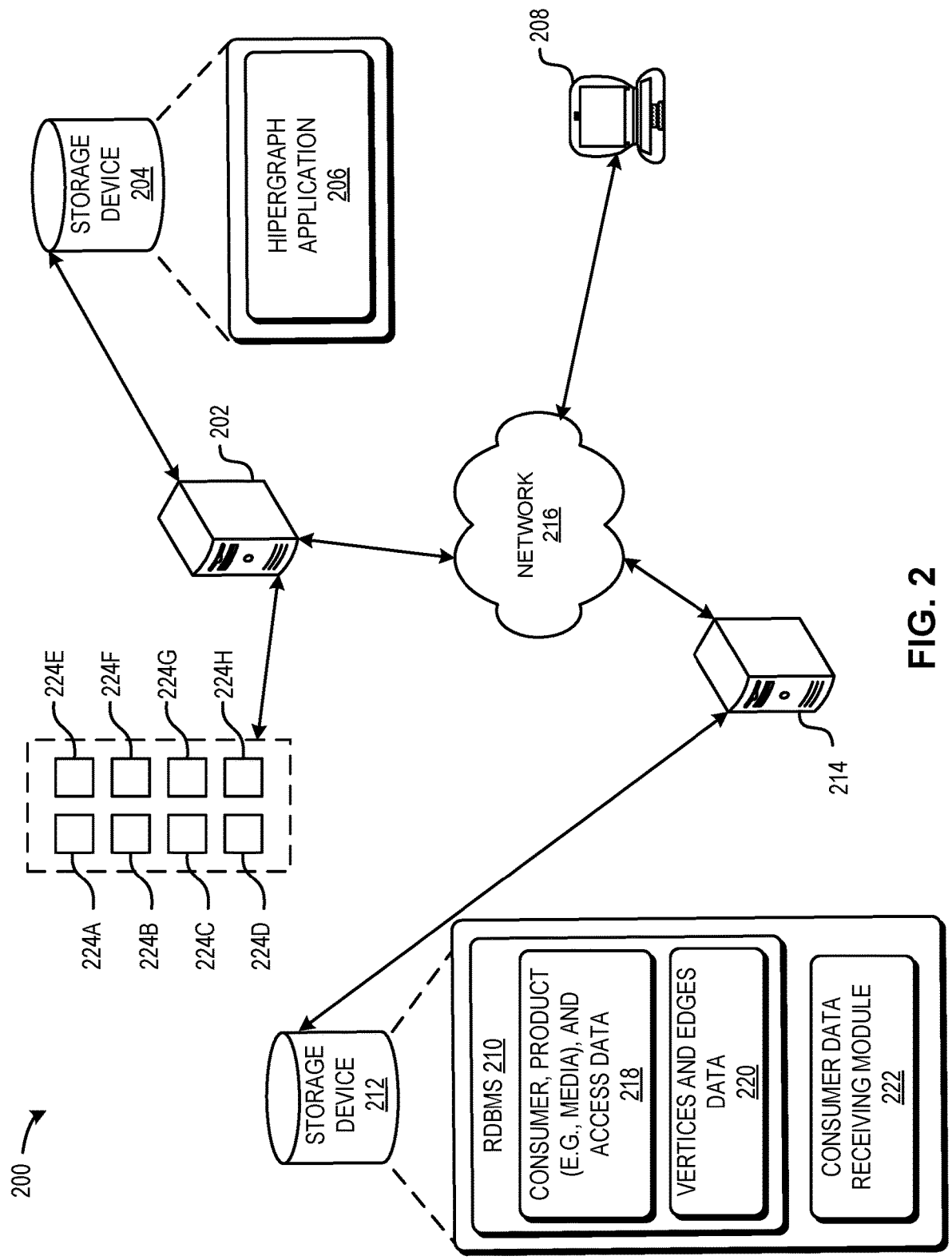
FIG. 2 presents a block diagram illustrating an exemplary architecture of an egocentric collaborative filtering system, according to an embodiment.

FIG. 2 presents a block diagram illustrating an exemplary architecture of an egocentric collaborative filtering system 200, according to an embodiment. System 200 may generate graphs and traverse through graphs to facilitate various applications such as collaborative filtering.

System 200 may include a Hipergraph server 202 with a storage 204. A Hipergraph application 206 may be installed on storage device 204. Hipergraph server 202 may receive a query from a client 208 (or receive a query locally on server 202). Hipergraph server 202 may receive queries that are written in a declarative language.

The query may request recommendations for one or more consumers (e.g., egos). Hipergraph application 206 may receive a graph from RDBMS 210 installed on a storage device 212 of a server 214. RDBMS 210 may stream the graph data to Hipergraph application 206 over a network 216. Note that in some embodiments, Hipergraph application 206 and RDBMS 210 may be installed on the same server and system 200 may copy the graph from one portion of the server memory to another in order to transfer graph data from RDBMS 210 to Hipergraph application 206.

System 200 may receive consumer, product (e.g., media), and access data 218, and generate vertices and edges 220. System 200 may store in storage device 212 code for a consumer data receiving module 222 that receives the consumer, product, and access data. System 200 may retrieve the program code for Hipergraph application 206 from storage device 204. Note that various implementations of the present invention may include any number of servers and storage devices.

In some implementations, Hipergraph server 202 may include a graph analytics engine or other components of egocentric collaborative filtering system 200 to perform the techniques described herein. In some implementations, system 200 may execute dynamic vertex-to-processor mapping to divide up the vertices of a graph into subranges, assign the various subranges to processors, and process the vertices using the respective processors. This improves utilization of available processors. For example, system 200 may dynamically divide the vertices and assign the vertices to processors 224A-224H, which operate on the assigned vertices.

How is Problem Solved Today—Input and Output Description

The input data is a list of egos for which the system computes recommendations, as well as the accessed table in FIG. 1. The bulk of the work performed does not need to reference the consumer or the media tables (such tables are only necessary when needing to map the ID numbers back to their human-readable names). The inventors use an actual dataset which contains on the order of tens of millions of vertices and hundreds of millions of edges that correspond to the rows of the accessed table.

FIG. 3 presents an example 300 of formatted output of the collaborative filter, according to an embodiment. As illustrated in FIG. 3, output 300 includes rows of triples that include a consumer ID, a media ID, and a number of votes. The consumer ID column indicates for which consumer the system performs the recommendation. The media ID column indicates the item that the system recommends to the consumer, and the number of votes column indicates how many votes their friends cast for that media. This disclosure defines the ego's "friend" as other consumers who access at least one media in common with the ego. Each friend casts one vote for each media the friend accesses in common with the ego.

Note that the examples presented herein describe consumers accessing media and generating a recommendation for media, but embodiments of the present invention may generate recommendations for any type of purchased, consumed, viewed, or accessed products.

Graph Database Comparison

Various graph-based systems currently available include Neo4j, a graph database, and GraphLab, an open-source package for machine learning. HiperGraph outperforms both of these technologies at a fine-grained primitive level. Because HiperGraph has been demonstrated to have significantly faster primitives for graph traversals, the techniques disclosed herein which make use of several such primitives chained together in series can only be faster by comparison. See U.S. patent application Ser. No. 14/039,941, entitled "System And Method For A High-Performance Graph Analytics Engine," by inventors Rong Zhou and Daniel Davies, filed 27 Sep. 2013, which describes experimental results using Hipergraph.

SQL Comparison

FIG. 4 presents an example 400 of a SQL query for the egocentric collaborative filter, according to an embodiment. Due to the prevalence of the relational model, data is typically stored in SQL databases and SQL can be used in a collaborative filtering implementation. The inventors compared two different SQL systems and the details are described below. Aside from minor system-specific syntax, the queries are nearly identical, and are presented in FIG. 4.

The set of egos that the system computes recommendations for is contained in table batched_egos, as seen in line 6. Table accessed is as described earlier, and all tables have column names cid representing consumer ID and pid representing media ID. Lines 6-8 join the desired set of egos with the accessed table twice, so that the system can find the set of friends that access the same media as that of the ego.

Line 9 excludes the ego from being considered a friend of him or herself. Finally, the group-by clause in line 10 computes the number of media that the ego accesses in common with each friend. Thus, lines 5-10 generate an intermediary table called friends_media which contains three columns: the ego, the friend, and the number of media accesses in common between the two.

The friends_media intermediary table is joined in line 11 with the accessed table again to find the media that might be recommended, and the group-by clause in line 13 tallies up the number of friends that vote for that media. Here, a friend who accesses a particular media is considered to cast one vote for that media. Note that the where clause in line 12 requires that the database system consider only friends who have at least one media purchase in common with the ego. Therefore, lines 4-13 generate an intermediary table of three columns: the ego, the media to recommend, and a count of the number of friends who vote for that media.

The select statement of line 3 sorts the previous results using a ranking function over the number of votes, and the entire query from lines 2-15 selects the top 100 most popular (or alternatively, most voted on) media recommendations for each ego. Line 15 sorts these recommendations in the order required for the final output.

Note that in some embodiments of the present invention, an egocentric collaborative filtering system can determine a total amount of points, stars, or other ratings measure assigned to a media or other product by consumers that are friends, and the system sorts the media or other product according to the determined total amount. The system can also assign a greater weighting to those friends that have a greater number of common media accesses with the ego, or assign a greater weighting to those friends that have a greater number of edges of different edge types in common with the ego. The system can also assign greater weighting to friends with common accesses that have occurred more recently, or assign greater weighting to those friends with a greater number of common accesses within a predetermined time period.

The system may use a batch of egos as input for computing recommendations, instead of starting with a single ego. The application must answer recommendation queries constantly, and it is highly inefficient for the SQL database to conduct multiple joins for every single ego serially. The system can achieve higher efficiency by processing the initial egos all simultaneously in a group. At some point, with a large enough ego batch size the system runs out of memory because the intermediary tables for a large accessed table exceed memory capacity. In experiments the inventors have tuned this and other parameters to give the SQL database the best performance possible while still respecting its memory constraints. For example, the inventors found that the SQL databases perform best when the entire query is expressed as a single nested statement, due to the maturity of the query optimizers.

Exemplary Egocentric Collaborative Filter and Implementation Using Hipergraph Primitives FIG. 5 illustrates an overview 500 of an exemplary egocentric collaborative filter and implementation using HiperGraph primitives, according to an embodiment. The disclosed egocentric collaborative filtering technique makes use of various HiperGraph primitive operations. The description below outlines the structure of the egocentric collaborative filter technique implemented for a specific set of parameters.

As illustrated in FIG. 5, an exemplary implementation may include initializing data structures and starting with the ego vertex. The system may traverse edges representing accessed relationships to a set of vertices representing media. The system then traverses from the set of vertices representing media, the edges representing accessed relationships to a set of vertices representing other consumers. From each of these consumers, the system traverses their adjacent edges to reach the set of vertices representing the media they accessed. At each media vertex, the system may tally up the number of consumers from which the system traverses to arrive at the media vertex. The system may then sort the results based on the tallies at each media vertex and return the top k media.

Five Stages of a Technique for Egocentric Collaborative Filtering

FIG. 6 presents a block diagram 600 illustrating five stages of a technique for egocentric collaborative filtering, according to an embodiment. Note that in step 4 of FIG. 6, the number of consumers voting for a given media is different from the number of consumers that access the media. The set of consumers in step 4 are those determined in step 3 that access a media in common with the ego. Also, the description above is a specific instantiation of the parameterized egocentric collaborative filter which the inventors have implemented. Specifically, one embodiment permits the user to specify the following parameters on the command-line:

The number of ego vertices for which the system will perform steps 1-5 of FIG. 6. An outer loop runs through all desired egos, and computations are logically independent from one another due to local data structures. This allows the system to compute the egos in parallel.

A set of edge types that determine the set of consumers in step 3. For example, the consumers in step 3 might alternatively be determined by the set of vertices for which the ego shares an "accessed" media in common and a "like" media in common. This requires that the input graph have multiple edge types connecting vertices together. The set of consumers generated must be connected via the media in all of the specified ways and the set of media must be connected to the ego in all of the specified ways as well.

The number of media that must be shared in common between the ego and the set of consumers computed in step 3.

The final filtering mechanism, which is one of the three following options:

Return all media and their corresponding tallies.

Return the top k media and their tallies, ranked in decreasing order of their tally count, where k is user-specified.

Return all media and their corresponding tallies if their tallies are greater than a predetermined threshold value n, where n is user-specified.

HiperGraph and SQL Database

Figure 7:
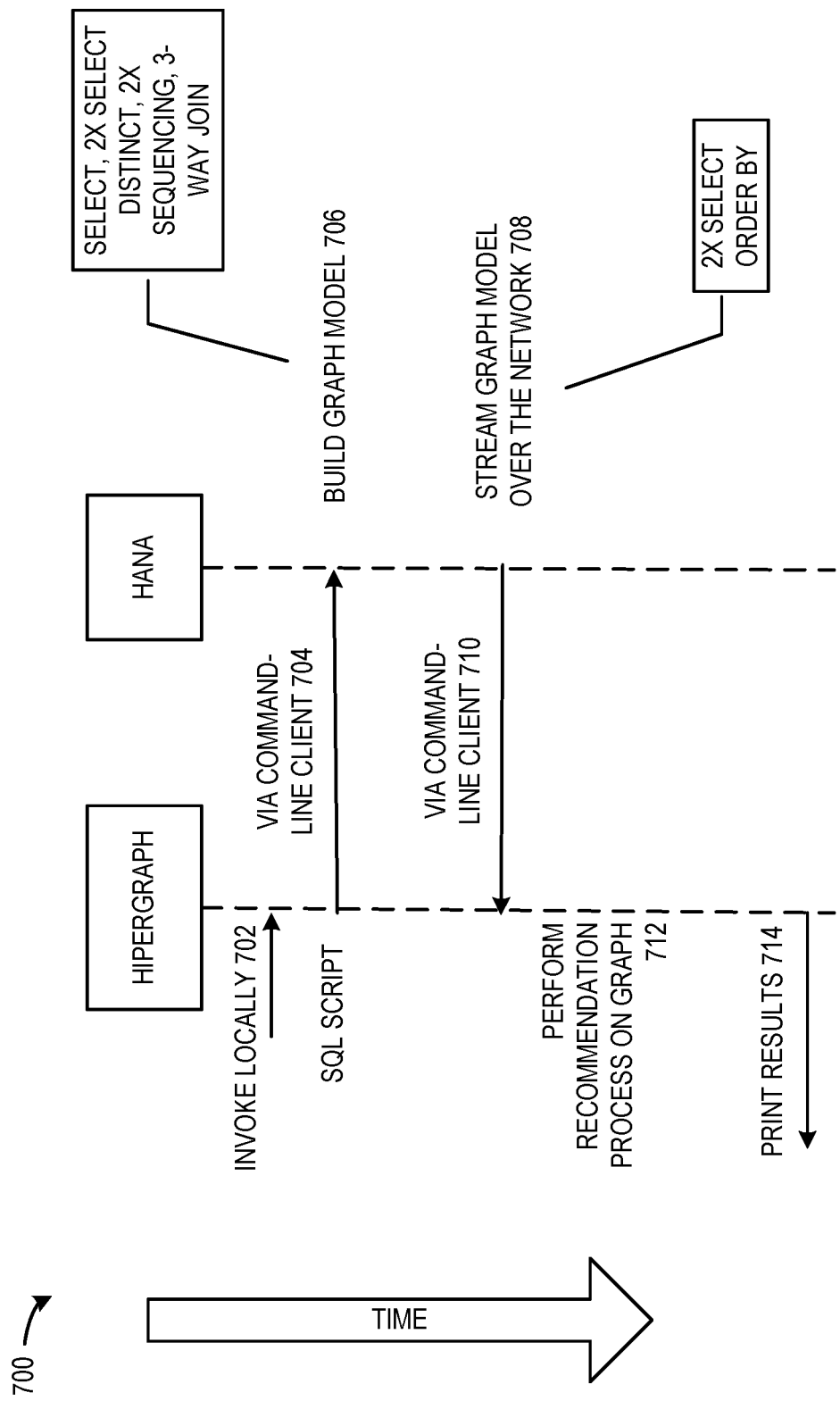
FIG. 7 presents a sequence diagram showing how HiperGraph and a SQL database communicate with one another, according to an embodiment.

FIG. 7 presents a sequence diagram 700 showing how HiperGraph and the SQL database communicate with one another, according to an embodiment. In the figure, HANA is a specific instance of an RDBMS. Recall that HiperGraph requires a graph model in order to reason over data. Since the data is typically stored in a SQL database, one implementation involves integrating HiperGraph with the SQL database so that the graph model can be automatically generated and streamed over to HiperGraph. The architecture for integrating a RDBMS and HiperGraph is illustrated in the sequence diagram of FIG. 7.

When a media recommendation is required, the system can invoke HiperGraph (operation 702), which uses a SQL-like language and a command-line client to communicate with a SQL database (operation 704). In this case, the system uses SAP HANA, an in-memory enterprise database system, and the command-line client provided by SAP, which communicates via standard input and standard output. Experiments demonstrate that the command line client from SAP is faster than a manual ODBC connection.

Within the SQL database, the system builds the graph model (operation 706) with various calls to SQL select, sequencing, and join constructs as mentioned in U.S. patent application Ser. No. 14/148,435, entitled "Automated Compilation Of Graph Input For The Hipergraph Solver," by inventors Eric Huang, Rong Zhou, and Daniel Davies, filed 6 Jan. 2014. After the system builds the model, the system streams the model over the network back to HiperGraph (operations 708 and 710), which then is able to perform reasoning on the graph model (operation 712) and output the results (operation 714). This example and the experiments use SAP HANA, because SAP HANA is an in-memory database representing the best-in-class for SQL servers. SAP HANA is one of the fastest, if not the fastest, enterprise in-memory SQL server available. Note that various implementations may use any SQL server, since the experimental setup leverages standard SQL interfaces and language to construct the graph model and integrate with HiperGraph. Typical enterprise RDBMSs built around disk storage will likely be significantly slower as SAP HANA has 1 TB of memory and performs all computations in RAM without touching the disk. All the experiments use the exact same dataset, which has on the order of tens of millions of vertices and hundreds of millions of edges.

Exemplary Process for Real-Time Egocentric Collaborative Filtering

Figure 8:
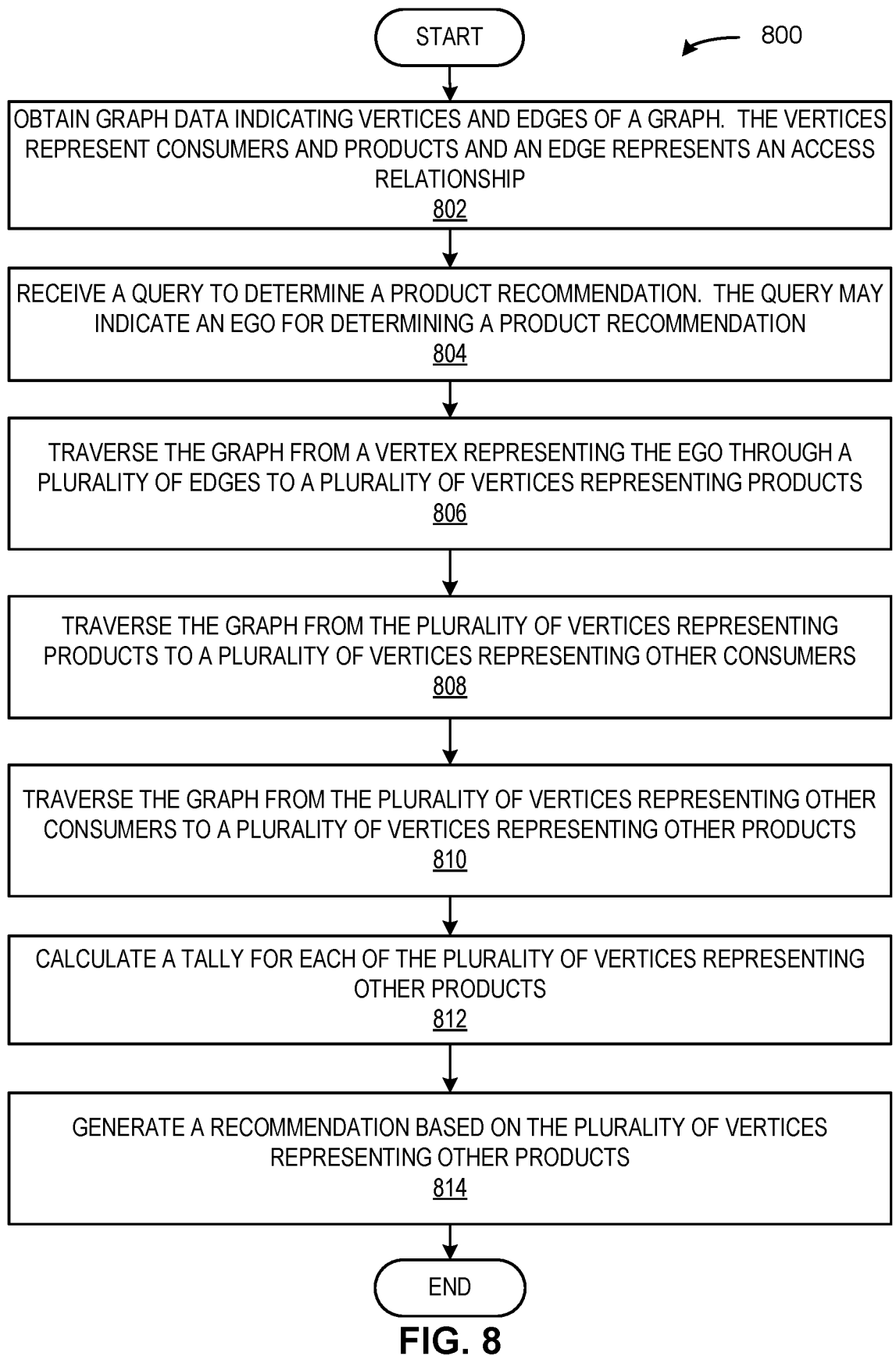
FIG. 8 presents a flowchart illustrating an exemplary process for real-time egocentric collaborative filtering, according to an embodiment.

FIG. 8 presents a flowchart 800 illustrating an exemplary process for real-time egocentric collaborative filtering, according to an embodiment. During operation, system 200 obtains graph data indicating vertices and edges of a graph. The vertices represent consumers and products and an edge represents an access relationship (operation 802). The system may receive a query to determine a product recommendation. The query may indicate an ego for determining a product recommendation (operation 804). The system may then traverse the graph from a vertex representing the ego through a plurality of edges to a plurality of vertices representing products (operation 806). The system may then traverse the graph from the plurality of vertices representing products to a plurality of vertices representing other consumers (operation 808). The system subsequently traverses the graph from the plurality of vertices representing other consumers to a plurality of vertices representing other products (operation 810). The system may calculate a tally for each of the plurality of vertices representing other products (operation 812). The system may generate a recommendation based on the plurality of vertices representing other products (operation 814).

Egocentric Collaborative Filter Using Hipergraph Performance

A relational database management system may load, reference, and modify a dataset that includes tens of millions of vertices and hundreds of millions of edges, but performing many joins on such a dataset would be infeasible. Thus, the system uses HiperGraph to compute media recommendations for "consumers who access at least one media that the queried consumer also accesses," since the system may avoid relational joins implied by this query and perform graph traversals in HiperGraph. The result is that computing recommendations of the form of the egocentric collaborative filter using HiperGraph significantly outperforms using the traditional SQL database.

The inventors ran multiple experiments using various dataset sizes from 1 month of an accessed transaction table up to 3 years' worth of data, and also varied the number of recommendation computations from 100 egos up to 100,000 egos.

FIG. 9 presents a table illustrating a comparison of two egocentric collaborative filtering implementations HANA-only and a combination of HANA and HiperGraph. FIG. 9 shows the results of experiments. Each cell of the table compares the HANA (SQL database) example described with respect to FIG. 4 to the HANA and HiperGraph combination architecture of FIG. 7. Each cell is a different query size and dataset size. Notice that in the lower-right cells the HANA database runs out of memory because the combination of batched egos with the size of the accessed datasets causes the intermediary tables (resulting from all the joins) to exceed memory capacity. In contrast, the HANA plus Hipergraph implementation successfully computes and returns the results.

The four top right cells in the table represent cases where the HANA plus Hipergraph implementation outperforms the standard HANA installation as well. The cells in the first two results columns (e.g., 0.1 k egos column and 1 k egos column) represent cases where the standard HANA installation outperforms the HANA plus Hipergraph implementation. Notice that for a very small set of egos on the scale of one thousand, the HANA plus Hipergraph implementation does not perform better than the standard HANA installation. However, when needing to provide recommendations for 10 k egos, the HANA plus Hipergraph implementation becomes competitive, and beyond that the HANA plus Hipergraph implementation significantly outperforms the standard HANA installation.

Comparing Hadoop/Hive with HiperGraph.

Another standard approach uses a Hadoop/MapReduce framework as the database. When working with large datasets, a standard architecture may be to use Hadoop to store the data, and then use the MapReduce framework to reason over it. In particular Hive, an application program interface (API) layer that sits on top of Hadoop, interprets SQL-like statements, optimizes the query, and runs the necessary MapReduce programs to compute results. The Hive/Hadoop combination represents another approach for solving this problem. The inventors have implemented and benchmarked such a system using the same datasets.

FIG. 10 presents a table 1000 of experimental results comparing implementations of the egocentric collaborative filter on Hadoop/Hive with HiperGraph. FIG. 10 compares the time for Hive/Hadoop to compute recommendations to the time required for HANA/HiperGraph to do the same. For various batch sizes of egos, the inventors measured the amount of time required to finish computing recommendations for that set of egos as well as the amount of memory and disk space required to perform the computations.

There are various points to consider when interpreting these results. Note that the experiment uses the full dataset of hundreds of millions of rows instead of a subset, because it is only for datasets this large that someone skilled in the art would consider using Hive/Hadoop, thereby motivating this experiment. Note also that the experiment directly compares the amount of disk space Hive requires to the amount of memory that HiperGraph requires, because these are the resources that both systems use in order to hold intermediary computations. Thus, this comparison of resource usage is more appropriate for assessing scalability as opposed to a memory-memory comparison (which Hive doesn't leverage), or a disk-disk comparison (which HiperGraph doesn't leverage). Finally, because HiperGraph requires building a graph model but Hive does not, for a fair comparison the HiperGraph results include the graph model building and network transmission times.

Note that for a small number of batch requests, HiperGraph's time is dominated by the graph modeling and network streaming, which is a flat cost of 40:01 for the entire dataset.

Comparing Time Performance Between Hive and Hipergraph

FIG. 11 presents a table 1100 comparing time performance between Hive and HiperGraph, with a breakdown of graph building, streaming, and HiperGraph reasoning. FIG. 11 breaks down HiperGraph's total time into the time required to build and stream the graph and the time to compute over this graph. This one-time, up-front cost pays back significantly when computing a much larger set of recommendations. For 1,000 and 10,000 egos, HiperGraph completes the computation significantly faster than Hive even when counting the time for building and streaming the graph. Recall that at 1,000 and 10,000 egos, the intermediary tables that Hive generates due to the SQL joins increases the required disk space significantly, and for an input dataset that is only a few gigabytes the required disk space approaches one terabyte. HiperGraph, on the other hand, does not suffer from significantly increased storage requirements because the database joins that Hive must perform require negligible memory when performed as graph traversals in HiperGraph. This is why HiperGraph maintains a flat memory requirement for larger and larger sized batches of egos.

Note that Hive attempts to process all egos simultaneously whereas HiperGraph processes them individually in serial (in some embodiments Hipergraph may process the egos in parallel). Although one may say that both Hive and HiperGraph are making tradeoffs between memory/disk required with computation time, the experiments reveal that HiperGraph dominates Hive/Hadoop in this tradeoff game, because HiperGraph has exceeded Hive in both performance and memory/disk efficiency. The inventors performed the experiments in this section with hardware that included Hive/Hadoop running on a 10-server cluster. The SAP HANA SQL database had access to 1 TB of RAM, which was representative of the best-in-class for SQL databases. The server that Hipergraph was running on was a 24-core Intel Xeon 3.33 GHz system with 96 GB of RAM (even though the memory capacity of the hardware was not fully utilized).

General Template and Mapping Hipergraph Primitives to Relational Primitives

FIG. 12 presents a table illustrating a general template for a class of egocentric collaborative techniques that leverage paragraph primitives, in accordance with an embodiment. As illustrated in FIG. 12, the template includes operations that start with a given set of vertices (possibly only a single one) initialized to user-specified values. While not done, the system may (a) perform either a forward or backward graph traversal by forwarding the values of the current set of vertices to their adjacent vertices, (b) apply some aggregation function which sets each vertex to a value proportional to the values from those adjacent vertices, and (c) apply some threshold function to each vertex. The system may then sort the result and return the top k vertices ranked by their computed values.

FIG. 13 presents a table illustrating how Hipergraph primitives may map to relational primitives, in accordance with an embodiment. There is evidence from experiments that suggest significant gains in performance in addition to memory/disk space efficiency compared to SQL installations on the same class of techniques. One may be able to achieve the same types of performance gains and memory efficiency for the class of techniques that uses the primitives shown in FIG. 13. The map function offers some flexibility with defining a function to map the vertex value to another set of values.

Although this disclosure uses the multimedia domain for an exemplary implementation, the techniques presented in this disclosure are more general, because vertices and edges in a graph representation map directly to entities and relations in standard database representations. Instead of consumers, media, and accesses, different implementations may have people, places, and event attended. For example, some implementations may use doctors, patients, and medical claims. The collaborative filtering algorithm can apply to various other domains as well.

Exemplary Apparatus

Figure 14:
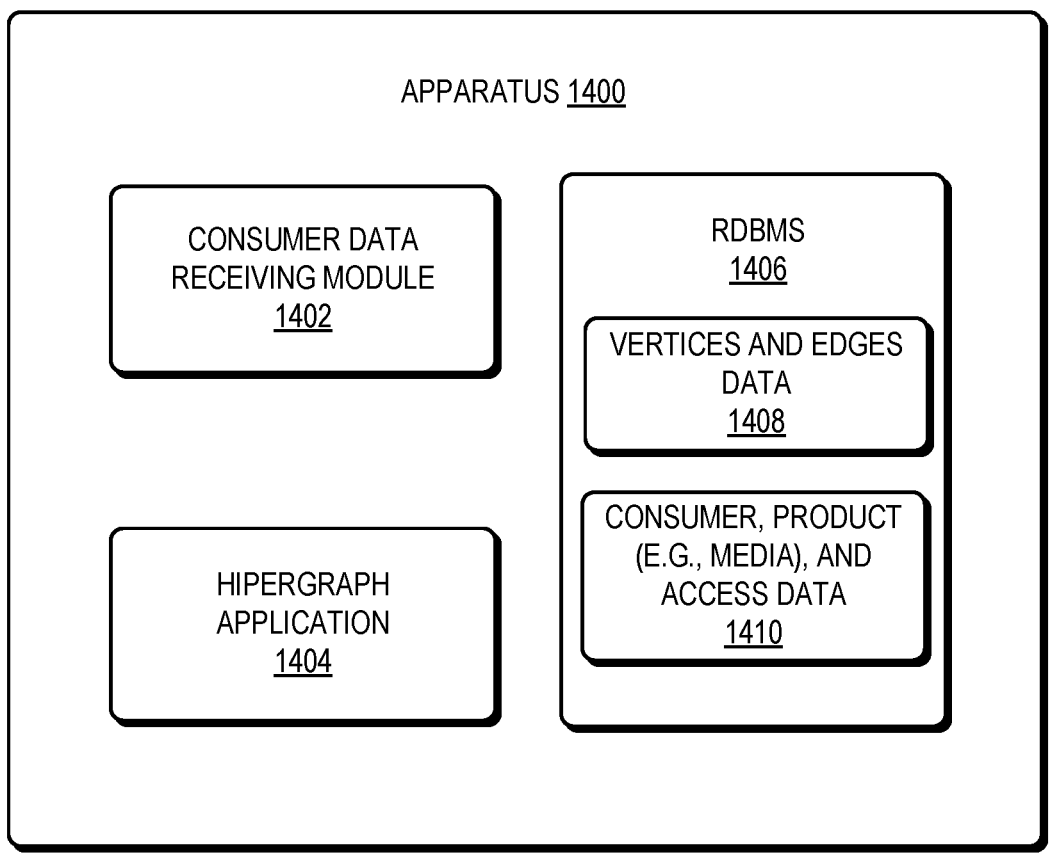
FIG. 14 presents a block diagram illustrating an exemplary apparatus that facilitates egocentric collaborative filtering, in accordance with an embodiment.

FIG. 14 presents a block diagram illustrating an exemplary apparatus 1400 that facilitates egocentric collaborative filtering, in accordance with an embodiment. Apparatus 1400 can comprise a plurality of modules which may communicate with one another via a wired or wireless communication channel. Apparatus 1400 may be realized using one or more integrated circuits, and may include fewer or more modules than those shown in FIG. 14. Further, apparatus 1400 may be integrated in a computer system, or realized as a separate device which is capable of communicating with other computer systems and/or devices. Specifically, apparatus 1400 can comprise a consumer data receiving module 1402, a Hipergraph application 1404, a RDBMS 1406, vertices and edges data 1408, and consumer, product (e.g., media), and access data 1410. Note that apparatus 1400 may also include additional modules not depicted in FIG. 14.

In some embodiments, consumer data receiving module 1402 can receive consumer, product (e.g., media), and access data. Hipergraph application 1404 may perform operations on a graph to provide a recommendation. RDBMS 1406 may include a storage for storing vertices and edges data 1408 and consumer, product (e.g., media), and access data 1410. RDBMS 1406 may generate the graph based on the consumer, product, and access data.

Exemplary System

Figure 15:
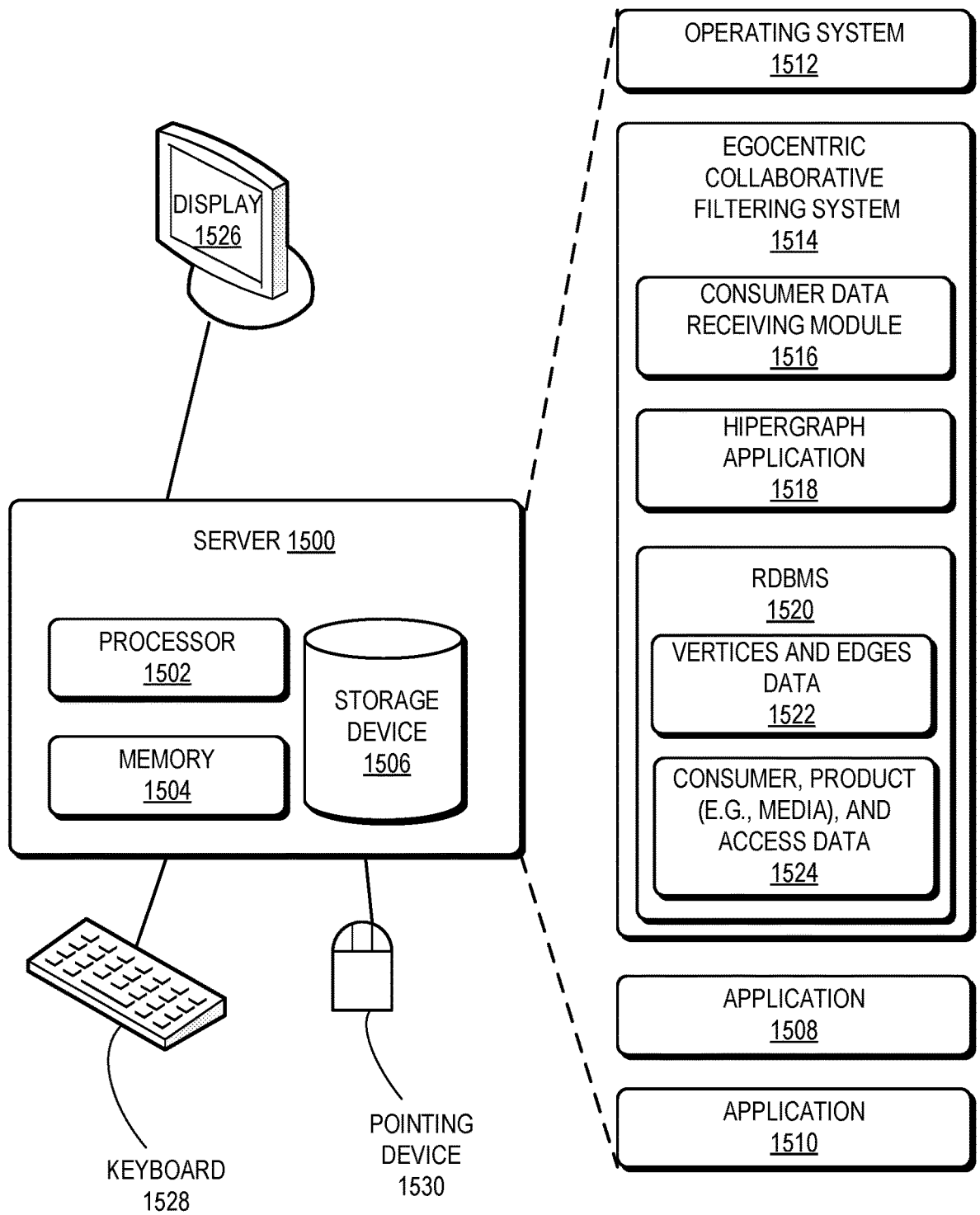
FIG. 15 illustrates an exemplary egocentric collaborative filtering server, in accordance with an embodiment.

FIG. 15 illustrates an exemplary egocentric collaborative filtering server 1500, in accordance with an embodiment. In one embodiment, server 1500 includes a processor 1502, a memory 1504, and a storage device 1506. Storage device 1506 stores a number of applications, such as applications 1508 and 1510 and operating system 1512. Storage device 1506 also stores egocentric collaborative filtering system 1514 that includes a consumer data receiving module 1516, a Hipergraph application 1518, a RDBMS 1520, vertices and edges data 1522, and consumer, product (e.g., media), and access data 1524. Server 1500 may generate and copy the vertices and edges data 1522 to a memory section accessible to Hipergraph application 1518. During operation, one or more applications, such as egocentric collaborative filtering system 1514, are loaded from storage device 1506 into memory 1504 and then executed by processor 1502. While executing the program, processor 1502 performs the aforementioned functions. System 1500 may be coupled to an optional display 1526, a keyboard 1528, and a pointing device 1530.

In some embodiments, consumer data receiving module 1516 can receive consumer, product (e.g., media), and access data. Hipergraph application 1518 may perform operations on a graph to provide a recommendation. RDBMS 1520 may include a storage for storing vertices and edges data 1522 and consumer, product (e.g., media), and access data 1524. RDBMS 1520 may generate the graph based on the consumer, product, and access data.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for generating a product recommendation, comprising:
   retrieving a dataset comprising information associated with consumers and products from a database running on a database management system (DBMS) that supports execution of a query language;
   generating graph data indicating vertices and edges of a graph from the retrieved dataset, wherein the vertices represent the information associated with the consumers and products and an edge represents an access relationship between a consumer and a product indicated in the dataset;
   receiving a database query, which is expressed based on the query language, at the database to determine a product recommendation based on the information in the database;

converting the database query to a set of graph operation primitives of a graph solver, wherein the set of graph operation primitives are expressed based on the graph and mapped to a set of database operations associated with the database query;

performing the set of graph operation primitives on the graph using the graph solver to determine a set of vertices representing products; and generating a recommendation based on the set of vertices obtained from the graph solver as a response to the database query.

2. The method of claim 1, further comprising:

storing the graph data in one or more database tables of a graph database, which is distinct from the database, running on the DBMS; and streaming the graph data from the graph database over a network to an executing application.

3. The method of claim 1, further comprising:

receiving command-line parameters indicating a number of starting vertices, a number of recommendations to be generated, a number of traversals, or a number of media that must be shared in common between an ego associated with the database query and another consumer.

4. The method of claim 1, further comprising:

receiving a second database query, which is expressed based on the query language, at the database and determining recommendations for a plurality of egos based on the second database query;

determining, by a plurality of processors operating in parallel, a second set of graph operation primitives, which are expressed based on the graph, of the graph solver associated with the plurality of egos, wherein the second set of graph operation primitives are expressed based on the graph and mapped to a second set of database operations associated with the second database query;

performing the second set of graph operation primitives on the graph using the graph solver such that to determine a second set of vertices representing other products are determined;

calculating a tally for each of the second set of vertices;

sorting the second set of vertices; and generating a recommendation based on the sorted second set of vertices.

5. The method of claim 1, wherein the graph includes multiple edge types of the edges of the graph, wherein one of the edge types represents a like relationship between a respective consumer and a corresponding product, and wherein a vertex representing an ego associated with the database query and a plurality of vertices representing other consumers of products associated with the ego are connected via edges representing the like relationship.

6. The method of claim 1, further comprising:

calculating a tally for each of the set of vertices.

7. The method of claim 6, wherein generating the recommendation further comprises:

sorting and ranking the set of vertices; and generating the recommendation to include one of:

all products associated with the set of vertices and their corresponding tallies;

products associated with a subset of the set of vertices with tallies that are above a predetermined ranking; and products associated with a subset of the set of vertices with tallies that are greater than a predetermined user-specified value.

8. A non-transitory computer-readable storage medium storing instructions that when executed by a computer cause the computer to perform a method for generating a product recommendation, the method comprising:

retrieving a dataset comprising information associated with consumers and products from a database running on a database management system (DBMS) that supports execution of a query language;

generating graph data indicating vertices and edges of a graph from the retrieved dataset, wherein the vertices represent the information associated with the consumers and products and an edge represents an access relationship between a consumer and a product indicated in the dataset;

receiving a database query, which is expressed based on the query language, at the database to determine a product recommendation based on the information in the database;

converting the database query to a set of graph operation primitives of a graph solver, wherein the set of graph operation primitives are expressed based on the graph and mapped to a set of database operations associated with the database query;

performing the set of graph operation primitives on the graph using the graph solver to determine a set of vertices representing products; and generating a recommendation based on the set of vertices obtained from the graph solver as a response to the database query.

9. The computer-readable storage medium of claim 8, wherein the method further comprises:

storing the graph data in one or more database tables of a graph database, which is distinct from the database, running on the DBMS; and streaming the graph data from the graph database over a network to an executing application.

10. The non-transitory computer-readable storage medium of claim 8, wherein the method further comprises:

receiving command-line parameters indicating a number of starting vertices, a number of recommendations to be generated, a number of traversals, or a number of media that must be shared in common between an ego associated with the database query and another consumer.

11. The non-transitory computer-readable storage medium of claim 8, wherein the method further comprises:

receiving a second database query, which is expressed based on the query language, at the database and determining product recommendations for a plurality of egos based on the second database query;

determining, by a plurality of processors operating in parallel, a second set of graph operation primitives of the graph solver associated with the plurality of egos, wherein the second set of graph operation primitives, are expressed based on the graph and mapped to a second set of database operations associated with the second database query;

performing the second set of graph operation primitives on the graph using the graph solver such that a second set of vertices representing other products are determined;

calculating a tally for each of the second set of vertices;

sorting the second set of vertices; and generating a recommendation based on the sorted second set of vertices.

12. The non-transitory computer-readable storage medium of claim 8, wherein the graph includes multiple edge types of the edges of the graph, wherein one of the edge types represents a like relationship between a respective consumer and a corresponding product, and wherein a vertex representing an ego associated with the database query and a plurality of vertices representing other consumers of products associated with the ego are connected via edges representing the like relationship.

13. The non-transitory computer-readable storage medium of claim 8, wherein the method further comprises:
calculating a tally for each of the set of vertices.

14. The non-transitory computer-readable storage medium of claim 13, wherein generating the recommendation further comprises:
sorting and ranking the set of vertices; and
generating the recommendation to include one of:
all products associated with the set of vertices and their corresponding tallies;
products associated with a subset of the set of vertices with tallies that are above a predetermined ranking; and
products associated with a subset of the set of vertices with tallies that are greater than a predetermined user-specified value.

15. A computing system for generating a product recommendation, the system comprising:
one or more processors,
a non-transitory computer-readable medium coupled to the one or more processors having instructions stored thereon that, when executed by the one or more processors, cause the one or more processors to perform a method for generating a product recommendation, the method comprising:
retrieving a dataset comprising information associated with consumers and products from a database running on a database management system (DBMS) that supports execution of a query language;
generating graph data indicating vertices and edges of a graph from the retrieved dataset, wherein the vertices represent the information associated with the consumers and products and an edge represents an access relationship between a consumer and a product indicated in the dataset;
receiving a database query, which is expressed based on the query language, at the database to determine a product recommendation based on the information in the database;
converting the database query to a set of graph operation primitives of a graph solver, wherein the set of graph operation primitives are expressed based on the graph and mapped to a set of database operations associated with the database query;
performing the set of graph operation primitives on the graph using the graph solver to determine a set of vertices representing products; and
generating a recommendation based on the set of vertices obtained from the graph solver as a response to the database query.

16. The computing system of claim 15, wherein the method further comprises:
storing the graph data in one or more database tables of a graph database, which is distinct from the database, running on the DBMS; and
streaming the graph data from the graph database over a network to an executing application.

17. The computing system of claim 15, wherein the method further comprises:
receiving command-line parameters indicating a number of starting vertices, a number of recommendations to be generated, a number of traversals, or a number of media that must be shared in common between an ego associated with the database query and another consumer.

18. The computing system of claim 15, wherein the method further comprises:
receiving a second database query, which is expressed based on the query language, at the database and determining product recommendations for a plurality of egos based on the second database query;
determining, by a plurality of processors operating in parallel, a second set of graph operation primitives, which are expressed based on the graph, of the graph solver associated with the plurality of egos, wherein the second set of graph operation primitives are expressed based on the graph and mapped to a second set of database operations associated with the second database query;
performing the second set of graph operation primitives on the graph using the graph solver such that a second set of vertices representing other products are determined;
calculating a tally for each of the second set of vertices;
sorting the second set of vertices; and
generating a recommendation based on the sorted second set of vertices.

19. The computing system of claim 15, wherein the graph includes multiple edge types of the edges of the graph, wherein one of the edge types represents a like relationship between a respective consumer and a corresponding product, and wherein a vertex representing an ego associated with the database query and a plurality of vertices representing other consumers of products associated with the ego are connected via edges representing the like relationship.

20. The computing system of claim 15, wherein the method further comprises:
calculating a tally for each of set of vertices.

* * * * *